United States Patent
Simonsson et al.

(10) Patent No.: US 9,838,925 B2
(45) Date of Patent: Dec. 5, 2017

(54) METHOD AND A NETWORK NODE FOR DETERMINING AN OFFSET FOR SELECTION OF A CELL OF A FIRST RADIO NETWORK NODE

(75) Inventors: Arne Simonsson, Gammelstad (SE); Konstantinos Dimou, Stockholm (SE); Bo Hagerman, Tyresö (SE); Sara Landström, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 510 days.

(21) Appl. No.: 13/060,339

(22) PCT Filed: Jan. 26, 2011

(86) PCT No.: PCT/EP2011/051050
§ 371 (c)(1),
(2), (4) Date: Aug. 29, 2011

(87) PCT Pub. No.: WO2012/100822
PCT Pub. Date: Aug. 2, 2012

(65) Prior Publication Data
US 2012/0188884 A1  Jul. 26, 2012

(51) Int. Cl.
*H04L 12/28* (2006.01)
*H04W 36/00* (2009.01)
(Continued)

(52) U.S. Cl.
CPC ........ *H04W 36/0083* (2013.01); *H04W 36/22* (2013.01); *H04W 48/20* (2013.01); *H04W 84/045* (2013.01)

(58) Field of Classification Search
CPC . H04W 36/08; H04W 36/0083; H04W 48/20; H04W 36/04; H04W 84/045; H04W 16/08; H04W 72/042; H04W 16/32; H04W 36/0061; H04W 36/0094; H04W 36/24; H04W 4/02; H04W 52/244; H04W 36/20;
(Continued)

(56) References Cited

U.S. PATENT DOCUMENTS

2006/0128394 A1* 6/2006 Turina et al. .................. 455/453
2009/0190500 A1* 7/2009 Ji et al. .......................... 370/254
(Continued)

FOREIGN PATENT DOCUMENTS

WO WO 2010/052688      5/2010
WO WO 2010/052688   *  5/2014

OTHER PUBLICATIONS

Notification of Transmittal of International Search Report and Written Opinion, PCT/EP2011/051050 dated Oct. 10, 2011.
(Continued)

*Primary Examiner* — Alex Skripnikov
*Assistant Examiner* — Lionel Preval (57) ABSTRACT

A method and network node (110, 120, 140) for determining an offset for selection of a cell of a first radio network node (110) is provided. The network node (110, 120, 140) comprises a processing circuit configured to determine the offset based on a first distance value for indicating distance between the first radio network node (110) and a second radio network node (120). The network node (110, 120, 140) further comprises a transmitter configured to send information about the offset.

20 Claims, 5 Drawing Sheets

(51) Int. Cl.
*H04W 36/22* (2009.01)
*H04W 48/20* (2009.01)
*H04W 84/04* (2009.01)

(58) Field of Classification Search
CPC .............. H04W 36/36; G01S 2013/466; G01S 2013/468
USPC ..... 370/252, 254, 350, 230; 455/422.1, 424, 455/435.2, 453, 444, 434, 437, 509, 438
See application file for complete search history.

(56) References Cited

U.S. PATENT DOCUMENTS

| | | | |
|---|---|---|---|
| 2009/0239535 A1* | 9/2009 | Chun et al. ................ | 455/435.2 |
| 2010/0029274 A1* | 2/2010 | Deshpande et al. ....... | 455/435.3 |
| 2010/0112998 A1* | 5/2010 | Choudhury et al. ....... | 455/422.1 |
| 2010/0113035 A1* | 5/2010 | Eskicioglu et al. .......... | 455/444 |
| 2011/0151867 A1* | 6/2011 | Hirano ................ | H04W 8/183 455/434 |
| 2011/0244866 A1* | 10/2011 | Yamamoto ............ | H04W 36/22 455/438 |
| 2012/0082152 A1* | 4/2012 | Baldemair et al. ........... | 370/350 |
| 2012/0122448 A1* | 5/2012 | Mueck et al. ................ | 455/424 |
| 2012/0135771 A1* | 5/2012 | Futaki .................... | H04B 7/024 455/509 |
| 2012/0282931 A1* | 11/2012 | Giustina ............... | H04W 36/22 455/437 |
| 2012/0314569 A1* | 12/2012 | Liu ................... | H04W 36/0094 370/230 |

OTHER PUBLICATIONS

3GPP TSG RAN WG1 Meeting #61, Montreal, Canada May 10-14, 2010, R1-103387; XP050420455.
3GPP TSG-RAN WG1#63, Jacksonville, US, Nov. 15-19, 2010, R1-105879; XP050489758.
3GPP TSG-RAN WG4 Meeting #AH57, Austin, TX, Jan. 17-21, 2011, R4-110350; XP050500304.
3GPP TSG RAN WG1 #62-bis Meeting, Xi'an, China, Oct. 11-15, 2010, R1-105552; XP050450655.

* cited by examiner

METHOD AND A NETWORK NODE FOR DETERMINING AN OFFSET FOR SELECTION OF A CELL OF A FIRST RADIO NETWORK NODE

This application is the U.S. national phase of International Application No. PCT/EP2011/051050, filed 26 Jan. 2011, which designated the U.S., the entire contents of which is hereby incorporated by reference.

TECHNICAL FIELD

The present disclosure relates to the field of telecommunications. In particular, the present disclosure relates to a method and a network node for determining an offset for selection of a cell of a first radio network node.

BACKGROUND

Within the field of telecommunications, there is a constantly increasing demand for higher data rates and capacity. In order to improve data rates in an existing cellular network, it has been proposed to deploy low power base stations at locations, or areas, where high data rates are desired. To increase capacity, low power base stations are useful in areas with high traffic density or where macro base stations can not provide sufficient. In this manner, the low power base station will be located within a grid of macro base stations. The low power base stations, such as micro and/or pico base stations and the like, typically have lower transmit power than the macro base stations in the grid. A deployment with low power base stations within a grid of macro base station is referred to as a "heterogeneous network" or "heterogeneous deployment". Moreover, a layer of low power base stations is referred to as a micro/pico layer and the grid is referred to as macro layer, or macro layer grid.

Within the Third Generation Partnership Project Long Term Evolution release 9 (3GPP LTE), cell selection is based on power of reference symbols measured by a user equipment (UE). This power relates to the channel conditions the user equipment is experiencing. When the user equipment reports that it has better channel conditions to a neighboring cell, i.e. another cell than its serving cell, a handover to the neighboring cell is performed. The reference symbols are transmitted by a base station of the cell and a metric determined based on the reference symbol is commonly referred to as Reference Symbol Received Power (RSRP).

A known LTE system comprises a low power base station and a macro base station. A first coverage area of the low power base station is determined by measuring the power of reference symbols transmitted by the low power base station and comparing the measured power to a power level, measured on reference symbols transmitted by the macro base station. Since the transmit power of the macro base station is greater than the transmit power of the low power base station, a second coverage area of the macro base station is larger than the first coverage area of the low power base station. Thus, the low power base station may serve few user equipments, provided that there is a constant number of user equipments per unit area. In scenarios where the low power base station is located in a hotspot with a large number of user equipments, the low power base station may serve a significant number of user equipments.

It is important to offload the macro base stations by allowing the low power base stations to serve a significant share of the user equipments. If the macro base station is too heavily loaded (i.e. not offloaded enough), only user equipments served by low power base stations are able to reach high data rates. If fewer user equipments have to share resources of the macro layer, those user equipments can get higher data rates as well and more uniform data rates in the system can be achieved.

In many scenarios, it is expected that the low power base station is located in a hot spot such that user equipments in the hot spot are located closer to the low power base station than to the macro base station. A user equipment located near the low power base station can measure the power of the reference symbols from both the low power base station and the macro base station. The measured power of reference symbols from the low power base station may be higher than the measured power of reference symbols from the macro base station although the macro base station transmits reference symbols with higher power. As an example, this may happen when difference in pathloss (PL) between the low power base station and the macro base station is large. Pathloss is distance dependent. Therefore, user equipments close to the low power base station and far from the macro base station are often served by the low power base station.

In some releases of LTE, for example release 11 and higher, it is expected to be possible to extend the range of a cell of a low power base station by using a cell specific cell selection offset. By increasing this offset, the low power base station may be able to serve a larger number of user equipments.

In order to improve performance in the system, it has been proposed to apply a cell selection offset based on path loss. In this manner, the cell selection offset completely compensates for the difference in transmit power between the low power base stations and the macro base stations. Since all user equipments have similar transmit power, a cell selection offset based on path loss can be used in the uplink (UL) with reasonable success. With path loss based cell selection offset, the user equipment will be connected to the base station to which it has the best path loss conditions. As a result, the user equipment will experience an improved channel quality, interference will be reduced, and the load will be distributed more evenly between the macro base station and the low power base station. Distribution of load in the system may be referred to as load balancing. Hence, in the uplink the user equipments in an extended range of the low power base stations can get high data rates. "In an extended range" means herein an additional area that is served, i.e. covered, by the low power base station when a cell selection offset being greater than zero is applied, but was not served by the low power base station when the offset being equal to zero was applied.

Moreover, it has been proposed to increase the transmit power in the low power base stations. As a result, a coverage area of the cell of the low power base station is enlarged. As explained above, a higher transmit power yields a larger coverage area. However, in some scenarios, it may not be desired to increase the transmit power because the cost of such a low power base station with increased transmit power is expected to be higher than desired. Also, the size of the coverage area may become too large.

However, in the downlink (DL) the user equipments in the extended range may suffer from high interference from a neighboring macro base station. Known Inter-cell interference coordination (ICIC) schemes can be used to protect a data channel, but is not sufficient for control channels in the downlink. Therefore, in the case of range extension, or range expansion, it may be necessary to apply evolved ICIC based on Time Division Multiplexing (TDM) to protect downlink control channels. An evolved ICIC scheme may mute (or decrease) the transmit power of the macro base station according to a time schedule.

Consider a scenario, in which the macro layer is sufficiently offloaded by a low power base station thanks to a cell selection offset greater than zero, but a great number of user equipments is still served by the macro layer and only a few user equipments are served by the low power base station. In such scenario, muting of the macro layer will deprive the great number of user equipments, connected to macro base stations in the macro layer, from their resources in order to enable transmission to the few user equipments in the extended range of a low power base station. Since the great number of user equipments is deprived from their resources, performance for these user equipments may decrease even though the macro layer is sufficiently offloaded. As a result, there may be a decrease in performance for the system as a whole. Thus, in this scenario, cell range extension, or cell selection offset, does not provide a gain in terms of overall downlink system throughput. Therefore, the use of cell selection offset needs improvements.

SUMMARY

An object may be to improve performance in a telecommunication system.

According to an aspect, the object may be achieved by a method for determining an offset for selection of a cell of a first radio network node. The method comprises an action of determining the offset based on a first distance value for indicating distance between the first radio network node and a second radio network node. Furthermore, the method comprises another action of sending information about the offset.

According to another aspect, the object may be achieved by a network node for determining an offset for selection of a cell of a first radio network node. The network node may comprise a processing circuit configured to determine the offset based on a first distance value for indicating distance between the first radio network node and a second radio network node. The network node may further comprise a transmitter configured to send information about the offset.

In some embodiments, the network node may be a radio base station, a micro base station, a macro base station, an Operation and Maintenance system (OAM) and the like.

In some embodiments, the network node determines the offset based on a first distance value for indicating distance between the first radio network node and a second radio network node. Expressed differently, the offset for selection of the cell may be set in relation to a first position of the first radio network node relative a second position of the second radio network node. Thereby, the offset may be set, or adjusted, while making a trade off between offloading the second radio network node and exposing user equipments served by the first radio network node to interference from the second radio network node in the downlink. As an example, an increase of the offset implies greater offloading of the second radio network node as well as an increase of interference towards a user equipment served by the first radio network node. Therefore, by adjusting the offset an improvement of the overall system performance may be obtained.

Advantageously, some embodiments improve balancing of load of user equipment between the first and second radio network node.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar elements, parts, items or features, when applicable.

Figure 1A:
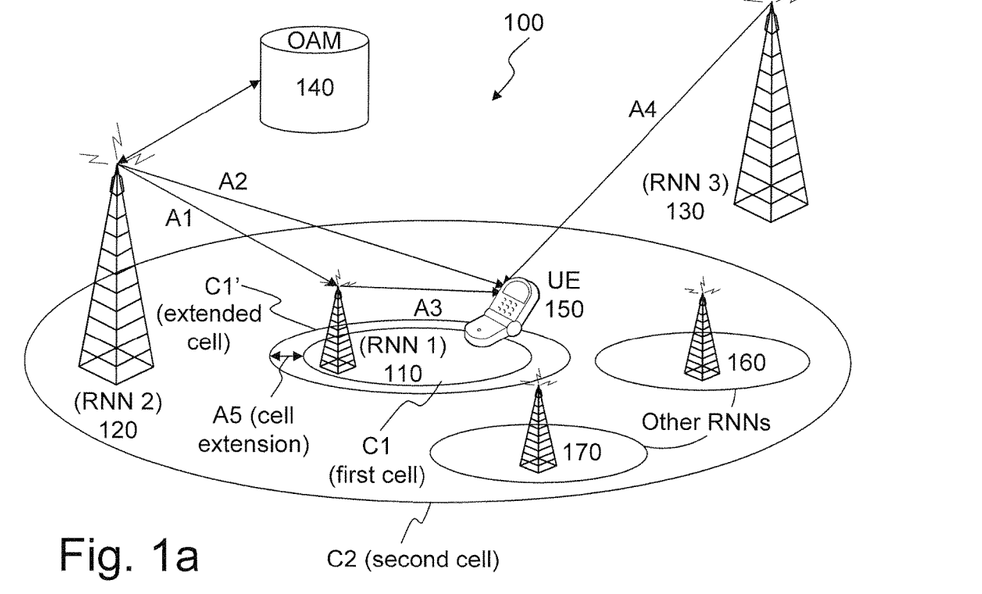
FIG. 1a shows a schematic overview of an exemplifying radio communication system.

FIG. 1a shows an exemplifying radio communication system 100, comprising a first radio network node 110, a second radio network node 120, a third radio network node 130, a central network node 140 and a user equipment 150. Generally, arrows A1-A4 indicate that the connected entities may communicate with each other. As examples, the arrows A1-A4 may indicate transmissions of reference symbols. Thus, as an example, arrow A2 may indicate that the second radio network node 120 may transmit reference symbols, which may be measured by the user equipment 150 in order to obtain RSRP.

In the example of FIG. 1a, the radio communication system 100 is an LTE system, the first radio network node 110 is a micro base station and the second radio network node 120 is a macro base station, such as an eNB. Moreover, the central network node 140 is an OAM system and the third radio network node 130 is another macro base station or the like.

Moreover in FIG. 1a, there are shown further radio network nodes 160 and 170. As an example, the further radio network nodes 160, 170 may be pico base stations. As another example, the further radio network nodes 160, 170 may be a pico base station and a micro base station, respectively. As an example, a difference between a pico and a micro base station is that the transmit power of the micro base station is higher than the transmit power of the pico base station.

As used herein, a user equipment may be a mobile phone, a cellular phone, a Personal Digital Assistant (PDA) equipped with radio communication capabilities, a smart phone, a laptop equipped with an internal or external mobile broadband modem, a portable electronic radio communication device or the like.

In other examples, the radio communication system 100 may be a WiMax system, a wideband code division multiple access (WCDMA) system or a Global System for Mobile Communications, often referred to as a GSM system.

A further arrow A5, shown in FIG. 1a, indicates the difference between a cell without range extension, as denoted by C1, and the cell with range extension, as denoted by C1'. The cell C1, C1' may be served by the first radio network node 110. Reference numeral C2 indicates a second cell C2 of the second radio network node 120.

In some embodiments, the cell C1, C1' of the first radio network node 110 is at least partly comprised in the second cell C2 of the second radio network node 120. Thus, a second coverage area of the second cell does at least partly overlap with a first coverage area of the cell of the first network node 110. When the first radio network node 110 and the second radio network node 120 according to this embodiment is comprised in a radio communication system, such radio communication system may be referred to as a heterogeneous radio communication system.

In some embodiments, the cell C1' is selected based on the offset and power of a reference signal transmitted by the first radio network node 110. The power of the reference signal is measured by a user equipment, such as user equipment 150, to be served by the first radio network node. As an example, selection of the cell C1' is performed in conjunction with handover from the second cell C2 to the cell C1'. A handover region may be defined as a region where both cells C2, C1' have equally strong downlink signal strength plus a handover hysteresis, or margin. The margin reduces toggling, sometimes referred to as ping-pong, of the user equipment 150 between being served by the cell C1' and the second cell C2. To reduce the ping-pong there are also filters, such as RSRP measurement filters and time to trigger filters. The handover region between these two cells can be adjusted, for example by means of setting the margin and filters to suitable values, to not take place in the handover region. The offset can be taken into account when determining a cell border, i.e. where handover from one cell to another cell should take place, between any pair of cells. The setting (or determination) of the offset may be static. A static setting of the offset may be useful to avoid placement of the border at a high way, which would result in unnecessarily frequent handovers. A dynamic setting may be useful to share load between the cell C1, C1' and the second cell C2. It may also be noted that the cell C1, C1' has a carrier frequency, which also may be used for the second cell C2.

Now, a few examples of how handover is handled in different radio communication systems 100 are put forward in order to provide examples of cell selection.

In a GSM system, the user equipment 150 reports handover measurements every 0.48 second and filtering and handover decisions are performed by a base station controller connected to the radio base station 120. Therefore, in GSM the offset need not necessarily be signalled to the user equipment 150.

In a WCDMA system, the user equipment 150 sends a handover event in order to trigger the handover. The offset may, therefore, be signalled to the user equipment 150.

In the exemplifying LTE system, both periodic reporting as for the GSM system and triggered handover as for the WCDMA system are supported.

Figure 1B:
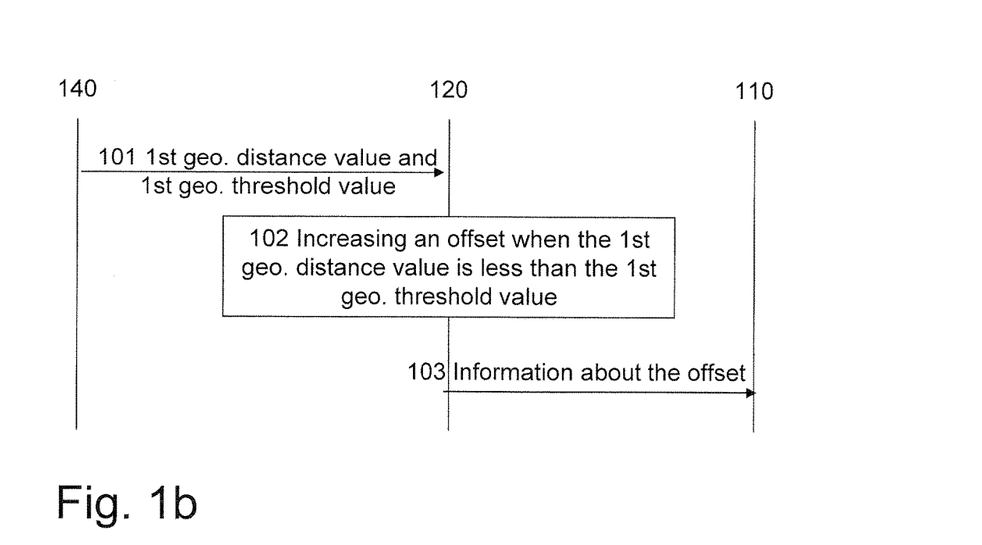
FIG. 1b shows a schematic, combined signaling and flow chart for illustrating interaction between some of the entities of FIG. 1a, when a non-limiting exemplifying method in the second radio network node of FIG. 1a is performed.

With reference to FIG. 1b, there is shown an exemplifying, combined signaling and flow chart of for explaining interaction between the macro base station 120 and the OAM system 140. This is a specific non-limiting example. The following actions are performed.

Action 101

The OAM system 140 sends the first geographical distance value and the first geographical threshold value to the macro base station 120. Expressed differently, the macro base station 120 receives the first geographical distance value and the first geographical threshold value from the OAM system 140. The first geographical distance is indicative of the distance between the macro base station 120 and the pico base station 110. The distance may be measured in meters or the like. The first geographical threshold value is indicative of a threshold for when range extension is to be switched on.

Action 102

The macro base station 120 turns on or increases an offset for the pico base station 110 when the first geographical distance value is less than the first geographical threshold value. The first geographical threshold value is set such that the offset, and thereby the coverage area served by the pico base station, is increased when the pico base station is located close to the macro base station, while the offset, and thereby the coverage area served by the pico base station, is not increased when the pico base station is far away. That is the first geographical threshold value is set somewhere between a closest possible position of the pico base station, i.e, close in relation to the macro base station 120, and the range of the macro cell, i.e, when the cell C1, C1' and the second cell C2 does not overlap the pico base station can not be used for offloading of the macro base station.

The offset may be set such that interference from the second radio network node towards user equipments, served by the first radio network node, can be handled by the user equipment 150 and/or other user equipments. That is, the offset may be increased from zero up to a point at which the performance of primarily the downlink control channels is still tolerable. An uplink data channel will usually be improved if the cell offset is increased until it compensates for the transmit power difference, whereas the downlink data channel in the extended range will become worse with increasing offset. There may still be a gain also in the downlink as more users can be served by the first base station when the offset is increased, thereby better offloading the second base station and resulting in better performance.

The larger the cell (i.e. radius of the cell) is, the higher the likelihood that it is already serving a significant share of the user equipments. Thus, it may be better to allow the macro base station, such as the second radio network node 120, to use its resources rather than extending the range of the first radio network node 110, when the first radio network node 110 is far away from the second radio network node 120. Therefore, it may be that the macro base station in some scenarios reduces or turns off the offset for the pico base station 110.

An advantage may be that improved balancing of load, from user equipments, between the first and second radio network nodes 110, 120 is obtained.

Action 103

The macro base station 120 sends information about the offset to the pico base station 110. In this manner, the pico base station 110 can take the offset into account when triggering handover. When the offset is taken into account, a range of the pico base station 110 increases, as denoted by cell C1 and cell C1' where cell C1' is the extended cell. Advantageously, with an increased cell C1' a larger number of user equipments may be served as compared to without range extension. Thereby, the macro base station 120 is offloaded.

In the non-limiting example of FIG. 1*b*, the first geographical distance is taken into account. However, in some embodiments it may not be sufficient to take only the first geographical distance into account. As an example of when the first geographical distance is not sufficient, a Pico eNB (which is an example of the first radio network node 110) is considered. The Pico eNB may be located geographically close to a macro eNB (which is an example of the second radio network node 120). However, the Pico eNB may be located indoors or outside coverage for transmissions from the macro eNB. In such situations, the Pico eNB may be able to serve several user equipments in the vicinity thereof thanks to that a large pico cell range, or large pico cell radius, may be obtained, even without range extension, as a result of low RSRP from the macro eNB. It is to be understood that outside coverage for transmission from the macro eNB implies that macro RSRP is low.

A number of distances, which may be taken into account when adjusting or determining the offset according to embodiments herein, will be summarized in the following presentation. Hence, the following definitions are valid throughout the present specification:

A first distance value is indicative of a first distance between the macro base station 120 and the pico base station 110. A first threshold value indicates a limit for the first distance value. Typically, the offset is increased when the first distance value is less than the first threshold value. The first distance value may comprise the first geographical distance value, mentioned above at FIG. 1*b*, and/or a first radio distance value. Similarly, the first threshold value may comprise a first geographical threshold value and/or a first radio threshold value. As an example, the first radio distance value may be measured by RSRP from the second radio network node 120, such as a macro base station, to the first radio network node 110, such as a pico base station. Moreover, the first radio distance may be determined by use of geographical distance propagation prediction while taking as input a known geographical distance. For example, a cell planning tool may provide such propagation prediction. Also statistics from handover measurements towards the second radio network node 120 may be used to estimate the first radio distance. As a further example, the first distance value may be based on any combination of one or more of radio distance, geographical distance and statistics to estimate the radio distance. For example, the first distance may be based on these measures in that an average, or the like, of radio distance, geographical distance and statistics is calculated.

A second distance value is indicative of a second distance between the macro base station 120 and the third radio network node 130, such as another macro base station. As an example, the second distance value may be an inter-site distance (ISD). A second threshold value indicates a second limit for the second distance value. Typically, the offset is increased when the second distance value is less than the second threshold value. The second distance value may comprise a second geographical distance value and/or a second radio distance value. Similarly, the second threshold value may comprise a second geographical threshold value and/or a second radio threshold value.

It may here be noted that the second radio distance value may be measured by RSRP and the second geographical distance value may be measured in meters.

In some embodiments, a load value may be taken into account when the offset is determined or adjusted. A load threshold value indicates a load limit for the load value.

In some embodiments, the load value may comprise a first load value indicative of a first load on the first radio network node 110.

In some embodiments, the first load value may comprise one or more of:

a first uplink buffer load value indicative of a first buffer load on uplink buffers relating to the first radio network node 110, a first downlink buffer load value indicative of a first buffer load on downlink buffers relating to the first radio network node 110, a first uplink user equipment load value indicative of number of user equipments served by the first radio network node 110 for uplink transmission, a first downlink user equipment load value indicative of number of user equipments served by the first radio network node 110 for downlink transmission a first uplink physical resource block, PRB, load value indicative of uplink PRB utilization, and a first downlink physical resource block, PRB, load value indicative of downlink PRB utilization.

In some embodiments, the load value may comprise a second load value indicative of a second load on the second radio network node (120).

In some embodiments, the second load value may comprise one or more of:

a second uplink buffer load value indicative of a second buffer load on uplink buffers relating to the second radio network node 110, a second downlink buffer load value indicative of a second buffer load on downlink buffers relating to the second radio network node 110, a second uplink user equipment load value indicative of number of user equipments served by the second radio network node 110 for uplink transmission, a second downlink user equipment load value indicative of number of user equipments served by the second radio network node 110 for downlink transmission, a second uplink physical resource block, PRB, load value indicative of uplink FRB utilization, and a second downlink physical resource block, PRB, load value indicative of downlink PRB utilization.

In some embodiments, there may be defined a first load threshold value in the same manner as the load threshold value above. Moreover, in some embodiments, a first downlink buffer load threshold value, a first uplink buffer load threshold value, a first uplink user equipment load threshold value, a first downlink user equipment load threshold value, a first uplink physical resource block load threshold value, and a first downlink physical resource block load threshold value, respectively, may likewise be defined.

In some embodiments, there may be defined a second load threshold value in the same manner as the load threshold value above. Moreover, in some embodiments, a second downlink buffer load threshold value, a second uplink buffer load threshold value, a second uplink user equipment load threshold value, a second downlink user equipment load threshold value, a second uplink physical resource block load threshold value, and a second downlink physical resource block load threshold value, respectively, may likewise be defined.

Figure 2:
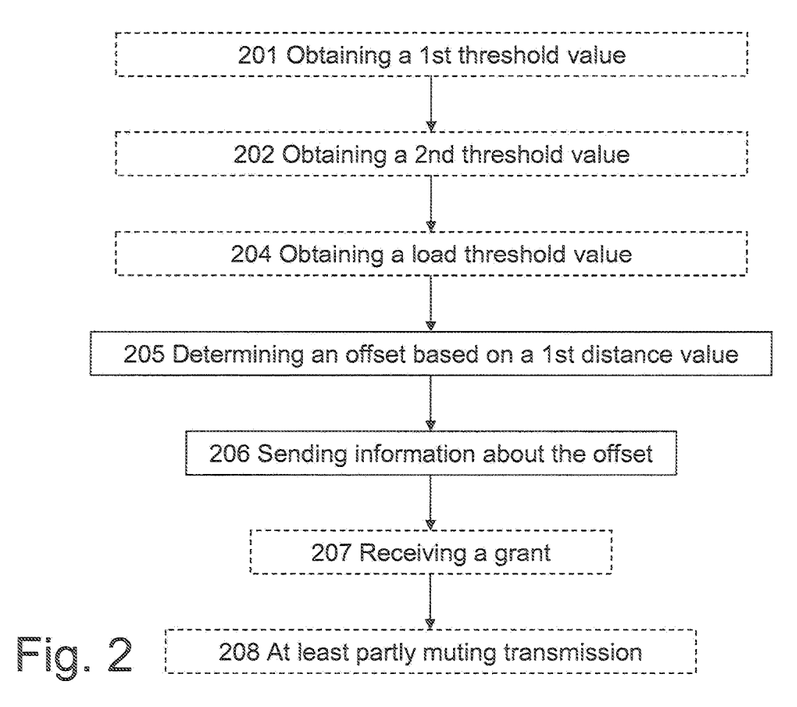
FIG. 2 shows a schematic flow chart of an exemplifying method in a network node for determining an offset for selection of a cell of a first radio network node.

Now referring to FIG. 2, there is shown a schematic, exemplifying flow chart of a method for determining an offset for selection of a cell of a first radio network node 110, The following actions, such as steps, may be performed. Notably, in some embodiments of the method the order of the actions may differ from what is indicated below. In this Figure, actions that appear in some embodiments are indicated by dashed lines. The actions may be performed by a network node, such as the first radio network node 110, the second radio network node 120, a central node 140 or the like, as will be explained below in conjunction with the description of each of the actions in FIG. 2.

Thus, in some embodiments, the second radio network node, such as a macro base station, is determining, or proposing, the offset. See example described in conjunction with FIG. 6 below. It may here be noted that even though the offset has been determined by the second radio network node, another node, such as a central network node 140 may override the determined offset and may decided that another offset is to be used. In some embodiments, the second radio network node 120 may be a master radio network node. In case of a Coordinated Multi-Point (CoMP) system, comprising at least the second radio network node 120 and the third radio network node 130, the master radio network node may be receiving/sending data via surrounding radio network nodes, such as the third radio network node 130. The surrounding radio network nodes are controlled by the master radio network node.

Thus, in some embodiments, the first radio network node, such as a pico base station, is determining, or proposing, the offset. See example described in conjunction with FIG. 7 below. Advantageously, the first radio network node 110 may trigger the determination of the offset when the first radio network node has detected that it is able to serve more user equipments than it is currently serving. It may in this context be noted that the offset, if determined by the first radio network node 110, may be overridden by an offset, determined by the second radio network node 120, which may have access to additional information as compared to the first radio network node. In this manner, the second radio network node 120 may be able to generate an offset that is more beneficial in view of overall system performance. Herein, the expression "overall system performance" has been used to express that performance for user equipments served by the first and second radio network node seen as an entity is considered. Hence, an increase in overall system performance may locally, i.e. for user equipments served by, for example, the first radio network node, imply decreased performance. Therefore, as an example, the second radio network node 120 may take into account that there are further radio network nodes 160, 170 in the second cell C2, when evaluating performance for user equipments served by it, i.e. served by the second radio network node 120.

Thus, in some embodiments, the central network node, such as an OAM, is determining, or proposing, the offset. The central network node 140 may have more information about traffic load and number of user equipments than, for example, the first radio network node 110 and/or the second radio network node 120. Hence, the central radio network node 140 may coordinate several radio network nodes, such as pico and/or macro base stations.

For each of the actions, there will be described embodiments in which the method is performed at least partly by the first radio network node 110, the second radio network node 120 and the central node 140, respectively.

In some embodiments, the information about the offset, such as an offset value, is set to an initial value. For example, the offset value is set to 0 dB according choice of an operator.

Action 201

In some embodiments, the network node 110, 120, 140 obtains the first threshold value.

In some embodiments, the first radio network node 110 obtains the first threshold value for the first distance value. As an example, the first radio network node 110 receives the first threshold value from the second radio network node 120.

In some embodiments, the second radio network node 120 may send the first threshold value to at least one of the further radio network nodes 160, 170 as well. In this manner, the same first threshold value is sent to several radio network nodes 110, 160, 170, such as pico base stations.

In some embodiments, the second radio network node 120 obtains the first threshold value for the first distance value. As an example, the second radio network node 120 receives the first threshold value from the central network node 140. As other example, the second radio network node 120 reads the first threshold value from a data storage medium. The data storage medium may be a memory within the second radio network node 120 or an external memory unit connected to the second radio network node 120. The memory unit may be a flash disk, magnetic hard drive, random access memory or the like. By obtaining the first threshold value in any or both of these manners, the second radio network node 120 may automatically (i.e. without human interaction) configure the first threshold value. When the first threshold value is read from the data storage medium the first threshold value may be preconfigured. The preconfigured first threshold value may be selected by an operator. Thus, less management is required. Advantageously, the first threshold value is configured in a cost-efficient manner.

In some embodiments, the second radio network node 120 may apply the first threshold value to at least one of the further radio network nodes 160, 170 as well. In this manner, the same first threshold value is applied to several radio network nodes 110, 160, 170, such as pico base stations.

Action 202

In some embodiments, the network node 110, 120, 140 obtains the second threshold value for the second distance value.

In some embodiments, the first radio network node 110 obtains the second threshold value for the second distance value. As an example, the first radio network node 110 receives the second threshold value from the second radio network node 120.

In some embodiments, the second radio network node 120 may send the second threshold value to at least one of the further radio network nodes 160, 170 as well. In this manner, the same second threshold value is sent to several radio network nodes 110, 160, 170, such as pico base stations.

In some embodiments, the second radio network node 120 obtains the second threshold value for the second distance value. As an example, the second radio network node 120 receives the second threshold value from the central network node 140. As other example, the second radio network node 120 reads the second threshold value from the data storage medium. In this manner, the second radio network node 120 may automatically (i.e. without human interaction) configure the second threshold value. When the second threshold value is read from the data storage medium the second threshold value may be preconfigured. Thus, less management is required. Advantageously, the second threshold value is configured in a cost-efficient manner.

In some embodiments, the second radio network node 120 may apply the second threshold value to at least one of the further radio network nodes 160, 170 as well. In this manner, the same second threshold value is applied to several radio network nodes 110, 160, 170, such as pico base stations.

Action 204

In some embodiments, the network node 110, 120, 140 obtains the load threshold value.

In some embodiments, the first radio network node 110 obtains the load threshold value. As an example, the first radio network node 110 receives the load threshold value from the second radio network node 120.

In some embodiments, the second radio network node 120 may send the load threshold value to at least one of the further radio network nodes 160, 170 as well. In this manner, the same load threshold value is sent to several radio network nodes 110, 160, 170, such as pico base stations.

In some embodiments, the second radio network node 120 obtains the load threshold value for the load value. As an example, the second radio network node 120 receives the load threshold value from the central network node 140. As other example, the second radio network node 120 reads the load threshold value from the data storage medium. In this manner, the second radio network node 120 may automatically (i.e. without human interaction) configure the load threshold value. When the load threshold value is read from the data storage medium the load threshold value may be preconfigured. Thus, less management is required. Advantageously, the load threshold value is configured in a cost-efficient manner.

In some embodiments, the second radio network node 120 may apply the load threshold value to at least one of the further radio network nodes 160, 170 as well. In this manner, the same load threshold value is applied to several radio network nodes 110, 160, 170, such as pico base stations.

In some embodiments according to action 201-204, thresholds, such as the first and/or second threshold values and/or the load threshold value, are sent to, or applied to, several radio network nodes 110, 160, 170, such as pico base stations. In this manner, coordination in terms of what offset is applied to the first radio network node 110 and to, for example, the further radio network nodes 160, 170 is made possible. In addition, coverage areas (or cells sizes) of these radio network nodes 110, 160, 170 may be made more similar, such as having equal radius or equal area.

As an example, when the same first threshold value is applied to the first radio network node 110 and one of the further radio network nodes 160, 170, these radio network nodes 110, 160, 170 may concurrently evaluate different offsets when the first distance value is smaller than the first threshold value. Typically, it may be the case that when the first radio network node 110, and possibly one of the further radio network nodes 160, 170, is close to the second radio network node 120, an increase of the offset is desirable due to that the cell C1 is typically "small" when the first radio network node 110 is located close to the second radio network node 120 if no offset, or a small offset, is used. Thus, these radio network nodes 110, 160, 170 may take advantage of when the second radio base station 120 is muted anyway. This may also imply better load balancing between the first and second radio network nodes 110, 120.

Similar advantages apply for when the second threshold value and the load threshold value is the same for several radio network nodes, such as the first radio network node 110 and at least one of the further radio network nodes 160, 170.

Action 205

In this action, the offset for selection of the cell C1, C1' of the first radio network node 110 is determined. Expressed differently, the range extension for the cell C1, C1' of the first radio network node 110 is set. As an action 205 of the network node 110, 120, 140, this may be expressed as the network node 110, 120, 140 determines an offset for selection of a first radio network node 110 based on the first distance value.

When the method is performed by the first radio network node 110, the first radio network node 110 determines an offset for selection of a cell of a first radio network node 110 based on the first distance value for indicating distance between the first radio network node 110 and the second radio network node 120.

When the method is performed by the second radio network node 120, the second radio network node 120 determines the offset for selection of a cell of the first radio network node 110 based on the first distance value for indicating distance between the first radio network node 110 and the second radio network node 120.

When the method is performed by the central network node 140, the central network node 140 determines the offset for selection of a cell of the first radio network node 110 based on the first distance value for indicating distance between the first radio network node 110 and the second radio network node 120.

According to some embodiments of action 205, the offset is based on the first distance value in that the offset is increased when the first distance value is less than a first threshold value for the first distance value.

In some embodiments, the offset is based on the first distance value in that the offset is inversely proportional to the first distance value. Thus, when the first distance value increases the offset is decreased.

In some embodiments when the method is performed by the first radio network node 110, the first distance value may be received from the second radio network node 120.

In some embodiments when the method is performed by the second radio network node 120, the first distance value may be received from the central network node 140.

In some embodiments, the first distance value may be read from the data storage medium. As an example, the first distance value may be preconfigured in that the first geographical distance may be known as soon as the first radio network node 110 has been employed since positions of nodes, such as macro/pico base stations, typically are defined when planning the network, such as the radio communication system 100, and included in a so called radio network planning data-base.

It may here be noted that the second distance value may be obtained in the same or similar manner as described above for the first distance value.

In some embodiments, the first distance value comprises a first radio distance value and/or a first geographical distance value. Since the coverage area of the first radio network node 110 depends on the first distance, a better estimate of the first distance value would improve the estimation of the coverage area. A better estimation of the first distance value may be obtained by using the first radio distance and/or first geographical distance when estimating the first distance value.

According to some embodiments of action 205, the offset further is based on a second distance value for indicating distance between the second radio network node 120 and a third radio network node 130.

In some embodiments, the offset is based on the second distance value in that the offset is increased when the second distance value is less than a second threshold value for the second distance value.

In some embodiments, the offset is based on the second distance value in that the offset is inversely proportional to the second distance value. Thus, when the second distance value increases the offset is decreased.

In some embodiments, the second distance value comprises a second radio distance value and/or a second geographical distance value.

In some embodiments the first distance is estimated by using existing user equipment handover measurements, referred to as statistics from handover measurements in conjunction with FIG. 1b above, in the pico base station. The user equipments measure and report RSRP from the macro base station. These measurements may be collected by the pico base station and statistically form, for example by means of an average calculation, the first radio distance value.

In this manner, no additional radio equipment is needed for frequency division duplex (FDD) band to measure on downlink frequencies in the pico base station.

For time division duplex (TDD) it is easier to measure in downlink, just another time-frame. Moreover, if an antenna of the pico base station is significantly higher positioned than the user equipments connected to the pico base station measurements by the user equipments do better represent the radio distance of the cell-area of interest. For indoor pico base stations this is typically not the case and these measurements are mostly a good estimate of the radio distance.

According to some embodiments of action 205, the offset further is based on the load value. In this manner, knowledge about the load value is combined with knowledge about the first and second distance value. This may provide improved load balancing and increased system performance.

In some embodiments, the load value comprises the first load value.

In some embodiments, the offset is based on the first load value in that the offset is inversely proportional to the first load value.

In some embodiments, the offset is based on the first load value in that the offset is decreased when the first load value is above the first load threshold value.

As an example, in case the first radio network node 110 is heavily loaded, it may not improve system performance to increase the offset to offload the second radio network node 120 by distributing a portion of the traffic to/from the second radio network node 120 to the first radio network node 110. Hence, the offset may instead be reduced in order to improve performance at least for user equipments served by the first radio network node 110. In another example, the second radio network node 120 may serve most of the user equipments, i.e. more user equipments than the first radio network node 110. When the offset is turned on or increased to a certain level, see offset threshold below at action 208, the second network node 120 may be obliged to mute during certain transmission time intervals. Therefore, the second radio network node may not use all its available resources for allocation to user equipments served by it. Nevertheless, since the first radio network node 110 may offload the second radio network node 120 when the offset is increased the overall system performance may still be improved.

Muting is beneficial when the first and second radio network nodes 110, 120 operate on the same frequency band, such as carrier frequency. In some embodiments, the first and second radio network nodes 110, 120 operate on different frequency bands, i.e. uses different carrier frequencies.

In some embodiments, the first load value comprises one or more of the first uplink buffer load value, the first downlink buffer load value, the first uplink user equipment load value, the first downlink user equipment load value, the first uplink physical resource block load value, and the first downlink physical resource block load value.

In some embodiments, the load value comprises the second load value. A purpose of the first radio network node 110 is to offload the second radio network node 120. Thus, load of the second radio network node 120 may be taken into account in order to improve overall system performance. As an example, in case the second radio network node 120 is not so heavily loaded, there is less need for offloading it, i.e. an increase of the offset may not be necessary.

In some embodiments, the offset is based on the second load value in that the offset is proportional to the second load value.

In some embodiments, the offset is based on the second load value in that the offset is increased when the second load value is above the second load threshold value.

In some embodiments, the second load value comprises one or more of the second uplink buffer load value, the second downlink buffer load value, the second uplink user equipment load value indicative, the second downlink user equipment load value, the second uplink physical resource block load value, and the second downlink physical resource block load value.

In some embodiments, the load value may be received, by the central network node 140, from the second radio network node 120.

According to some embodiments of action 205, the offset is further based on the carrier frequency of the cell. As an example, a first determined offset based on a first carrier frequency may be higher than a second determined offset based on a second carrier frequency when the first carrier frequency is lower than the second carrier frequency. The carrier frequency does in some environments affect the coverage area of the first radio network 110 node at a given distance. Thus, by taking the carrier frequency into account a better estimate of the offset may be obtained. As an example, higher carrier frequency yields greater radius of the cell of the first radio network node 110 in some models with line-of-sight, breakpoint, and frequency dependent propagation constants.

With reference to the first paragraph relating to FIG. 2, it may be noted that the method may be performed at least partly by the first radio network node 110 in that the first radio network node 110 may perform at least a portion of the method, while some other portion of the method may be performed by the second radio network node 120. As an example, the first radio network node 110 may determine the offset based on the first load combined with the first distance value. This offset may then be sent to the second radio network node 120, which modifies this offset by determining a new offset based on the received offset, the second distance value and the second load value. According to another example, the second radio network node 120 may determine whether it needs to be offloaded or not by using, for example, the second load value and the second load threshold value. That is, if the second load value is greater than the second load threshold value, the second radio network node 120 would prefer to be offloaded. Therefore, the second radio network node 120 may report this to the first radio network node 110, which may or may not change the offset using additional information such as the first load value and a corresponding first load threshold value.

Action 206

The network node 110, 120, 140 sends information about the offset.

When the method is performed by the first radio network node 110, the first radio network node 110 sends information about the offset. As an example, the first radio network node 110 sends information about the offset to the second radio network node 120.

When the method is performed by the second radio network node 120, the second radio network node 120 sends information about the offset. As an example, the second radio network node 120 sends information about the offset to the first radio network node 110. As an example, a macro base station may determine the offset and then send the determined offset to a Pico base station, which applies the offset for cell selection. Thus, setting of the offset may be managed (or controlled) from another node than the node that applies the offset.

In some embodiments, the information about the offset comprises an offset value.

In some embodiments, the information about the offset comprises a request for change of the offset. As an example, the first radio network node 110 may detect that it does not serve any user equipments, or only a few user equipments. Thus, the first radio network node 110 requests the offset to be increased in order to better offload, for example, a macro base station. As another example, the first radio network node 110 may request the offset to be reduced, when the first radio network node 110 detects that it needs to be offloaded by, for example, a macro base station. These examples show that the offset may be dynamically adapted to a current scenario. The current scenario may define one or more of a number of user equipments per unit area, requested data rates of the user equipments, the locations of the user equipment and the like.

In some embodiments, the information about the offset comprises a command for instructing the first radio network node 110 to set the offset to the offset value. In this manner, it is made possible to control, or to manage, the setting or determination of the offset from the second radio network node 120.

Action 207

In some embodiments, when the information about the offset comprises a request for change of the offset, the network node 110, 120, 140 receives a grant for the offset in response to the request for change of the offset. In this manner, the network node 110, 120, 140 is made aware of that the first radio network node 110 has accepted and applied an offset value comprised in the request for change of the offset.

In some embodiments, when the information about the offset comprises a request for change of the offset, the first radio network node 110 receives a grant for the offset in response to the request for change of the offset. In this manner, several decisions, or determinations, of offsets for low power base stations, which are examples of the first radio network node 110, may be coordinated. As an example, it may be beneficial to reduce transmissions from the second radio network node 120, i.e. mute the second radio network node 120, when a large number of pico base stations have received grant for the offset to the second radio network node 120.

In some embodiments, when the information about the offset comprises a request for change of the offset, the second radio network node 120 receives a grant for the offset in response to the request for change of the offset. In this manner, the second radio network node 120 is made aware of that the first radio network node 110 has accepted and applied the offset value comprised in the request for change of the offset.

Action 208

In some embodiments, when the offset is greater than an offset threshold for the offset, the network node 110, 120, 140 mutes at least partly transmission from the second radio network node 120. As an example, the network node 110, 120, 140 may send a command to the second radio network node 120. When the second radio network node 120 receives the command, it will interpret the command and mute its transmission. The muting of the second radio network node 120 reduces downlink interference towards the user equipment 150, served by the first radio network node 110.

In some embodiments, when the offset is greater than an offset threshold for the offset, the first radio network node 110 mutes at least partly transmission from the second radio network node 120. As an example, the first radio network node 110 may send a command to the second radio network node 120. When the second radio network node 120 receives the command, it will interpret the command and mute its transmission. The muting of the second radio network node 120 reduces downlink interference towards the user equipment 150, served by the first radio network node 110.

In some embodiments, when the offset is greater than an offset threshold for the offset, the second radio network node 120 mutes at least partly transmission from itself. As an example, the second radio network node 120 may detects that the offset value is greater than the offset threshold and, as a consequence thereof, the second radio network node 120 mutes at least partly transmission from itself. The muting of the second radio network node 120 reduces downlink interference towards the user equipment 150, served by the first radio network node 110.

Moreover, muting of macro base station, i.e, the second radio network node 120, may be turned off or reduced when range extension is switched off (or small). As an example, the second radio network node 120 will usually serve most of the user equipments. When the offset is turned off or reduced to a certain level, the second network node 120 is not obliged to mute during certain transmission time intervals any more. Therefore, the second radio network node may use all its available resources for allocation to user equipments served by it. Thus, the second radio network node may also improve performance for those user equipments. In some embodiments, muting may be based on time division multiplexing and/or frequency division multiplexing.

As an example, the offset threshold may be zero, but may also be a few dB. The muting reduces downlink interference towards a user equipment, served by the first radio network node 110. Radio resource usage may also be more efficient if muting is not turned on when not needed.

Figure 3:
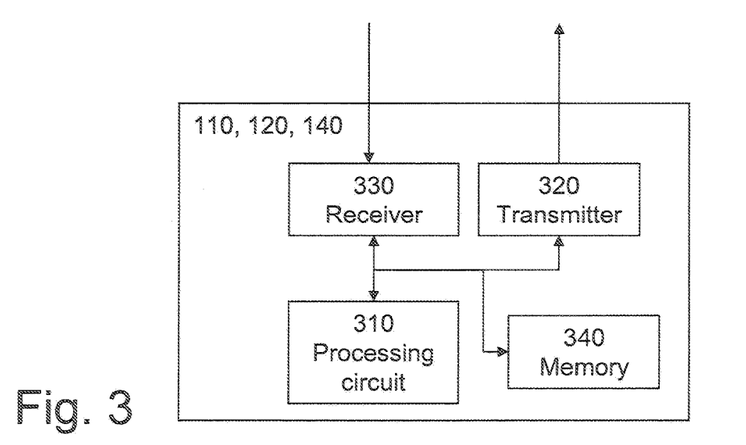
FIG. 3 shows a schematic block diagram of an exemplifying network node for determining an offset for selection of a cell of a first radio network node.

Turning to FIG. 3, there is illustrated a schematic block diagram of a network node 110, 120, 140, which is configured to perform the method of FIG. 2. Thus, the network node 110, 120, 140 is configured to determine the offset for selection of the cell of the first radio network node 110. The network node 110, 120, 140 may be the first radio network node 110, the second radio network node 120 or the central radio network node 140.

The network node may comprise a processing circuit 310 configured to determine the offset based on a first distance value for indicating distance between the first radio network node 110 and a second radio network node 120.

In some embodiments, the offset may be based on different measures as described above in conjunction with action 205. Hence, the processing circuit 630 may be configured accordingly. For example, the processing circuit 630 may further be configured to determine the offset based on the load value, the second distance value, the first load value and/or the second load value etc.

In some embodiments of the network node, the processing circuit 630 may be a processing unit, a processor, an application specific integrated circuit (ASIC), a field-programmable gate array (FPGA) or the like.

In some embodiments of the network node 110, 120, 140, the processing circuit 310 further is configured to obtain the first distance value.

In some embodiments of the network node 110, 120, 140, the processing circuit 310 further is configured to obtain the load threshold value and the load value.

In some embodiments of the network node 110, 120, 140, the processing circuit 310 further is configured to obtain a first threshold value for the first distance value.

In some embodiments of the network node 110, 120, 140, the processing circuit 310 further is configured to obtain a second distance value ISD between the second radio network node and a third radio network node 130 and a second threshold value for the second distance value.

In some embodiments of the network node 110, 120, 140, the processing unit 310 is configured to receive the load threshold value from a central network node 140 or is configured to read the load threshold value from a data storage medium.

In some embodiments of the network node 110, 120, 140, the processing unit 310 is configured to receive the second distance value ISD and the second threshold value from a/the central network node 140, or to read the second distance value and the second threshold value from a/the data storage medium.

In some embodiments of the network node 110, 120, 140, the processing unit 310 is configured to receive the first threshold value, or to read the first threshold value from a/the data storage medium.

In some embodiments of the network node 110, 120, 140, the processing unit 310 is configured to mute transmission from the second radio network node 120 on at least some resources, when the offset is greater than an offset threshold for the offset. The muting reduces downlink interference towards a user equipment in the extended range, served by the first radio network node 110.

In some embodiments of the network node 110, 120, 140, the processing unit 310 further is configured to receive the first distance value from a/the central network node 140, or to read the first distance value from a/the data storage medium.

Furthermore, the network node may comprise a transmitter 320 configured to send information about the offset.

In some embodiments of the network node 110, 120, 140, the transmitter 320 further is configured to send the information about the offset to the first radio network node 110.

In some embodiments of the network node 110, 120, 140, the transmitter 320 further is configured to send the information about the offset to the second radio network node 120.

In some embodiments of the network node 110, 120, 140, the network node further comprises a receiver 330 configured to receive a grant for the offset in response to the request for change of the offset.

In some embodiments of the network node 110, 120, 140, the receiver 330 further is configured to receive the load threshold value and the load value from the second radio network node 120.

In some embodiments of the network node 110, 120, 140, the receiver 330 further is configured to receive the second distance value ISD and the second threshold value from the second radio network node 120.

In some embodiments of the network node 110, 120, 140, the receiver 330 further is configured to receive the first threshold value from the second radio network node 120.

In some embodiments of the network node 110, 120, 140, the receiver 330 further is configured to receive the first distance value from the second radio network node 120.

In some embodiments of the network node, the network node may further comprise a memory 340 for storing software to be executed by, for example, the processing circuit. The software may comprise instructions to enable the processor to perform the method in network node as described above. The memory 340 may be a hard disk, a magnetic storage medium, a portable computer diskette or disc, Flash memory, random access memory or the like.

In some embodiments of the network node 110, 120, 140, the information about the offset comprises a request for change of the offset.

In some embodiments of the network node 110, 120, 140, the information about the offset comprises a command for instructing the first radio network node 110 to set the offset to the offset value.

In some embodiments of the network node 110, 120, 140, the second radio network node 120 is a macro radio base station or the like.

In some embodiments of the network node 110, 120, 140, the first radio network node 110 is a pico radio base station or the like.

In some embodiments of the network node 110, 120, 140, the cell of the first radio network node 110 is at least partly comprised in a second cell of the second radio network node 120.

Figure 4:
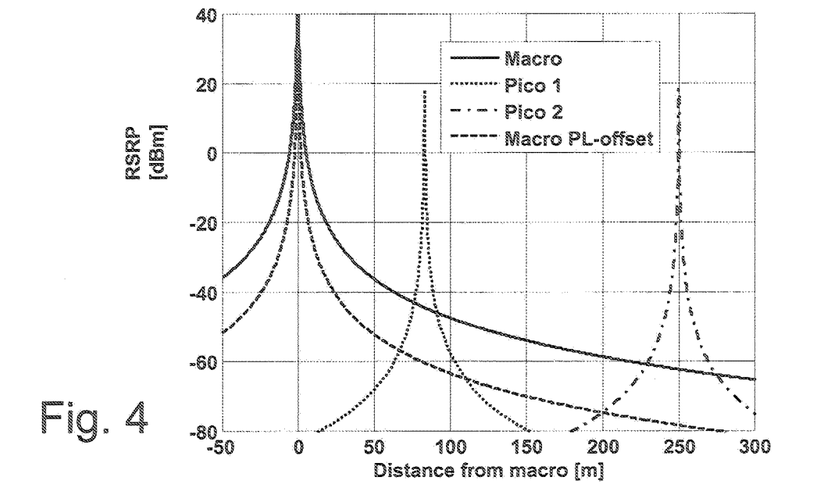
FIG. 4 shows a first exemplifying diagram in which transmit power is plotted as a function of distance from a macro base station.

FIG. 4 shows a first exemplifying diagram in which transmit power is plotted as a function of distance from a macro base station for a macro base station and a first and a second pico base station. The macro base station, denoted "Macro", may here be an example of the second radio network node 120 of FIG. 1*a*. The first pico base station, denoted "Pico 1", may here be an example of the first radio network node 110 of FIG. 1*a*. The second pico base station, denoted "Pico 2", may here be an example of one of the further radio network nodes 160, 170. The dashed line, denoted "Macro PL-offset", shows power distribution based on path loss for the macro base station. The macro base station may be a 40 W (46 dBm) macro base station located at 0 m along the x-axis, which is a horizontal axis denoted "Distance from macro" in FIG. 4. The y-axis is a vertical axis denoted "RSRP" in FIG. 4. Transmit power based on RSRP in the antenna direction with 14 dB antenna gain is shown as a function of distance as a solid black line. At distances 84 and 250 m there are 1 W (30 dBm) pico base stations Pico 1, Pico 2 with omni antennas with 5 dB antenna gain. RSRP corresponding to the pico base stations are shown as a dotted line and a dashed-dotted line, respectively. The crossings of the solid line with the dotted line and the dashed-dotted line indicate the handover border (or selection) without range extension (with RSRP cell selection) for the pico base stations Pico 1, Pico 2, respectively. The dashed line is RSRP of the macro base station compensated with the power difference between the macro base station and the pico base stations. The crossing with the dashed line represents range extension (with path loss cell selection). Hence, with range extension a threshold for selection of the picobase stations has been lowered. As can be seen from FIG. 4, a lowering of the threshold implies an extension of the coverage area.

Without range extension the pico cell sizes (or coverage area of pico base station Pico 1, Pico 2) will vary, see crossings with solid line in FIG. 4, and the pico cell (or pico base station) closest, i.e. at 50 m, to the macro base station will have a smaller cell radius than the pico cell at 250 m. The pico cell at 250 m will offload the macro (or macro base station) more than the other pico cell if the user density (hotspot traffic) is the same around both pico base stations Pico 1, Pico 2. The coverage area can be made similar by appropriately applying range extension in the pico cell closer to the macro. A distance dependent range extension will result in a better controlled offload of the macro cell. As an example, a pico base station that is far away from a macro base station may not need range extension to offload the macro base station. As shown in FIG. 4, the range, such as the coverage, of a pico cell located far away from a macro base station is larger. Hence, this pico cell, being far away from the macro base station (BS) may already have absorbed the amount of traffic that may provide a sufficient offloading of the macro base station. In this respect, it is unlikely that cell range extension of small cells far away from the macro is needed and consequently there is no need to apply muting to the macro layer so as to protect user equipments in the extended range of small cells. As a result, resources are used over all time slots in both layers (macro and pico layer). In the example of FIG. 4, range extension is binary and applied per pico cell, either RSRP or full compensation using PL based selection.

Figure 5:
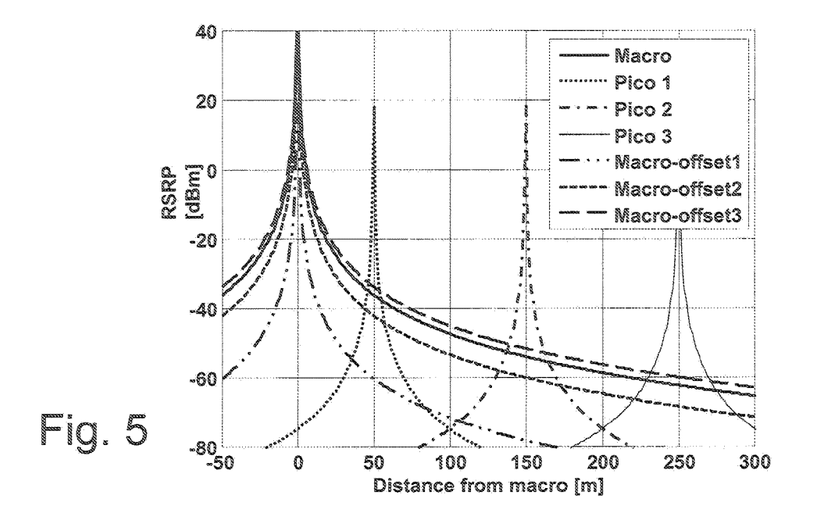
FIG. 5 shows a second exemplifying diagram in which transmit power is plotted as a function of distance from a macro base station.

FIG. 5 shows a second exemplifying diagram in which transmit power is plotted as a function of distance from a macro base station. In addition to lines, denoted "Macro", "Pico 1" and "Pico 2" as explained above in conjunction with FIG. 4, a further solid line having a peak at 250 m indicates a third pico base station Pico 3 (while noting that pico base station Pico 2 of FIG. 4 is located at 150 m in FIG. 5). FIG. 5 illustrates that the range extension offset may also be used to achieve a more refined pico cell offload control. A dashed-dot-dot line, denoted "Macro-offset1", a dashed line, denoted "Macro-offset2", and a long-dashed line, denoted "Macro-offset3", illustrate the macro RSRP with pico cell individual range extension offset. "Individual" in this context means that range extension offset is set individually for each pico base station. Thus, the pico base station Pico 2 may have a different offset as compared to the pico base station Pico 3. The offsets are selected to target (or match) a compensated macro cell RSRP (=RSPR-offset) at the pico cell site of −60 dB. This is seen as the crossing of lines, denoted "Macro-offset1", "Macro-offset2" and "Macro-offset3", at the pico position, such as 50 m, 150 m and 150 m, at −60 dB on the y-axis. The resulting range extension offset is set to 24, 6 and −2 dB. "24 dB" can be read out from the Figure at 50 m as the vertical difference between the dash-dot-dot line and the solid line of the macro. "6 dB" can be read out from the Figure at 150 m as the vertical difference between the dashed line, i.e. "Macro-offset2", and the solid line of the macro. "−2 dB" can be read out from the Figure at 250 m as the vertical difference between the dashed line, i.e, "Macro-offset3", and the solid line of the macro. The negative offset of −2 dB means that to get the desired cell size the pico cell at 250 m shall shrink to be smaller than with RSRP cell selection. With distance dependent pico cell individual cell extension offset as described with reference to FIG. 5, the cell size may be set to be approximately equal for pico base stations Pico 1, Pico 2 and Pico 3, i.e. around 20 m in radius as seen in FIG. 5.

In further embodiments, it is proposed to use mobile handover statistics to obtain a more refined estimation (or determination) of a pico cell size.

Figure 6:
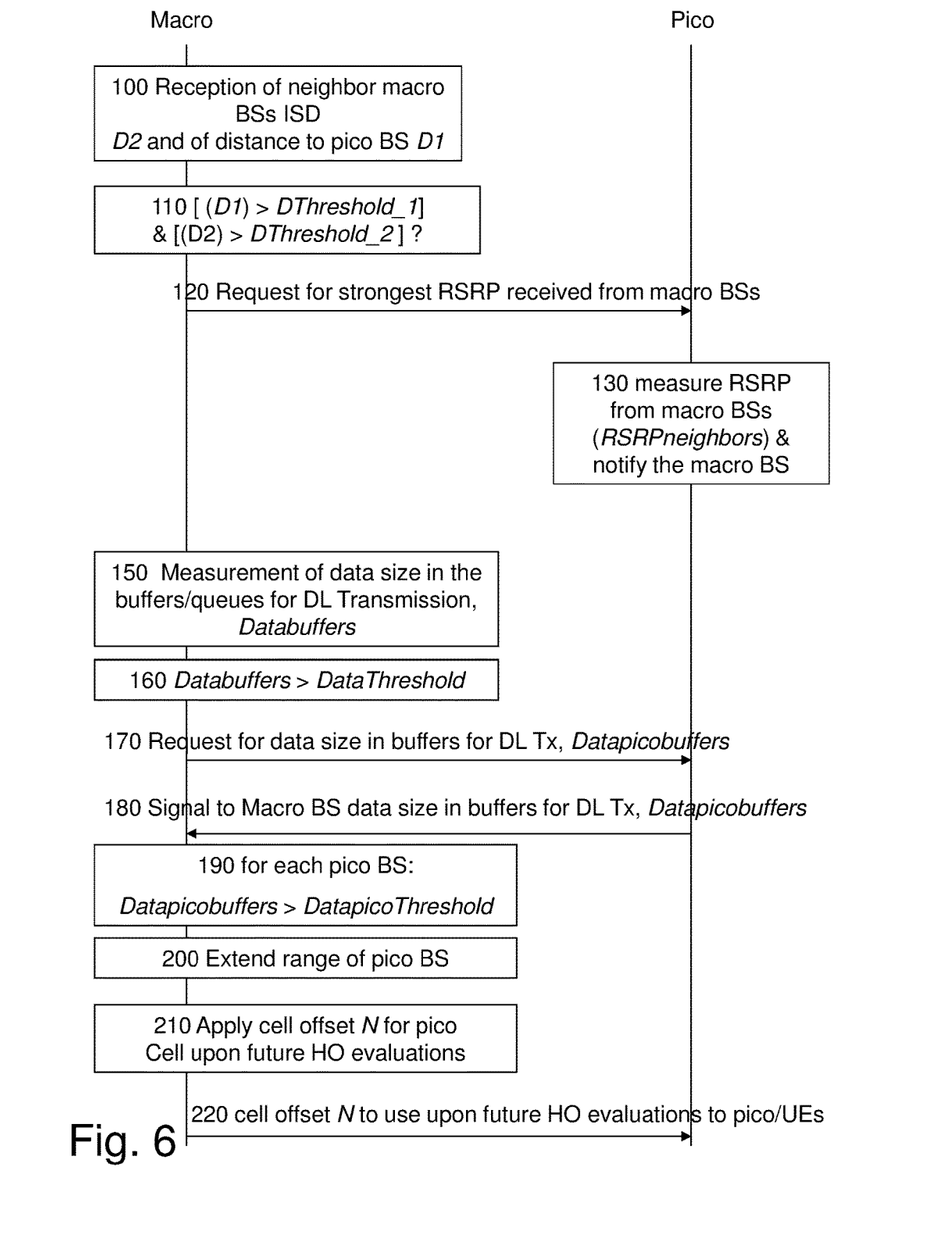
FIG. 6 shows an exemplifying, schematic combined signaling and flow chart for describing interaction between a macro base station and a pico base station.
Figure 7:
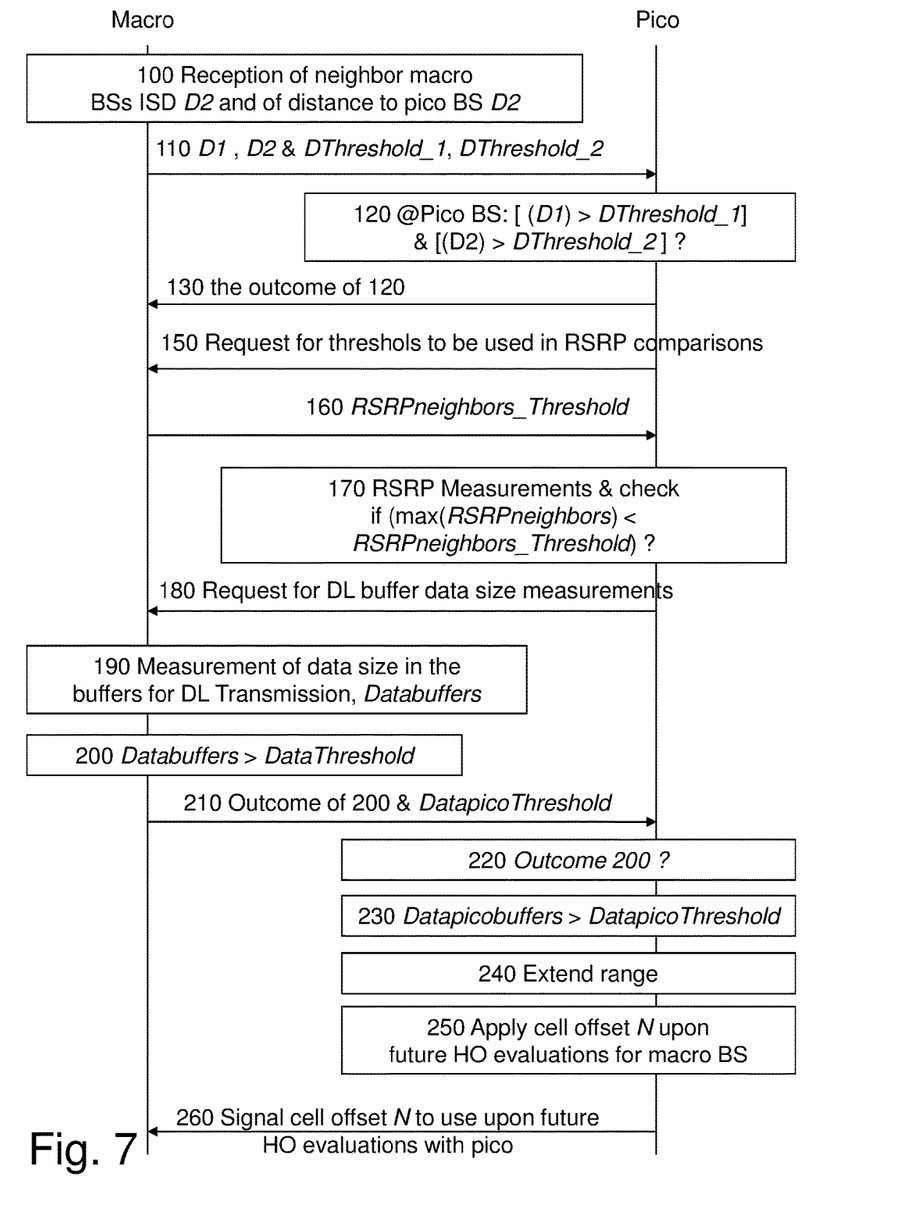
FIG. 7 shows another exemplifying, schematic combined signaling and flow chart for describing interaction between a macro base station and a pico base station.

In embodiments, either the macro base station, or the second radio network node 120, or the pico base station, or the first radio network node 110, may decide whether range extension should be applied as noted in conjunction with FIG. 2. In FIG. 6, the macro base station initiates the determination of the offset, whereas in FIG. 7 the pico base station initiates the determination of the offset. The methods presented in FIGS. 6 and 7 are iterative. For example, in FIG. 6 action 150 is performed again, while action 110 is not performed again until the method of FIG. 6 starts from the beginning. The action 110 need not be performed as frequent as action 150, since the geographical distance between the macro base stations and between the macro base station and the pico base station are not likely to change at all or are likely to change very infrequently.

Turning to FIG. 6, there is shown an exemplifying, schematic combined signaling and flow chart for describing a first exemplifying method for determining the offset, when performed in a macro base station (or the second radio network node). In this example, the macro base station has access to thresholds to be applied by both the macro and pico base stations. Information about the thresholds and/or values may be conveyed to the macro base station, which makes decisions or estimations. In the Figure, a macro base station is denoted "Macro" and a pico base station is denoted "Pico". In this example, the determination of the offset is performed stepwise (and iteratively) in that, for example, first the geographical distance and the inter-site-distances are taken into account for determining the offset, next the radio distances are taken into account and, finally, the load on macro/pico base stations, number of user equipments served and physical resource block utilization are taken into account. In the description below, "&" is a logical AND-operator and OR is a logical OR-operator. The following actions may be performed. In some embodiments, the order of the actions may differ from what is indicated below.

100 An OAM system (not shown) notifies the macro base station of the distance to pico base station, D1, within the coverage area of the macro base station, and of the inter-site distance with the neighbor macro base stations, D2. D1 is an example of the first (geographical) distance. D2 is an example of the second (geographical) distance. This action is exemplifies how the first distance value and the second distance value may be received as explained in action 205.

110 Macro base station checks if a condition (distance D1 to pico base stations is higher than DThreshold_1) & (distance D2 to neighbor macro base stations is higher than DThreshold_2) is true then action 120 is performed, otherwise return to action 100. The distance D1 is a geographical distance between the pico base station and the macro base station. The DThreshold_1 is set such that when distance D1 is greater than DThreshold_1 then a reduction of the offset (thus reducing the cell size) may be considered. The distance D2 (ISD) is a geographical distance between the macro base station and a neighboring macro base station. The DThreshold_2 is set such that when distance D2 is greater than DThreshold_2 then a reduction of the offset (thus reducing the cell size) may be considered. This action is an example of action 205 in FIG. 2.

Alternatively or additionally, the macro base station requests the pico base station to estimate the radio distance D1. The pico base station collects reported RSRP from user equipments, RSRPneighbors, on the macro base station by the user equipments connected to the pico base station. The RSRP is measured on reference symbols transmitted by the macro base station. The collected measurements are statistically processed, such as averaged or the like, into one RSRP value, in this manner, estimates of radio distance D1 between the macro base station and the picocell area, is obtained. Then, the pico base station signals to macro base station the average RSRP as the first distance. This action is an example of actions 201, 202 in FIG. 2.

150 Macro base station measures the amount of data in the buffers/queues for downlink transmission, Databuffers. The Databuffers is an example of the second load value. This action is an example of action 204 in FIG. 2.

160 Macro base station checks if a condition (Databuffers>DataThreshold) OR (number of active user equipments in uplink and/or downlink for macro>UserThreshold2) OR (%_PRB_Utilization_2>PRB_Threshold2) is true then an action 170 is performed, otherwise return to action 100. The DataThreshold is an example of the second downlink buffer load threshold value and/or the second uplink buffer load threshold value. UserThreshold2 is an example of the second uplink user equipment load threshold value and/or the second downlink user equipment load threshold value. "number of active user equipments in uplink and/or downlink for macro" relates to the second uplink user equipment load value and/or the second downlink user equipment load value. "%_PRB_utilization_2" is an example of the second uplink physical resource block load value and/or the second downlink physical resource block load value. The PRB_Threshold2 is an example of the second uplink physical resource block load threshold value and/or the second downlink physical resource block load threshold value. If the Databuffers is greater than the DataThreshold, the macro base station may need to be offloaded. Accordingly, an increase of the offset (thus increasing the cell size of the pico base station) may be considered. If the number of active user equipments in uplink and/or downlink for macro is greater than the UserThreshold2, the macro base station may need to be offloaded. Accordingly, an increase of the offset may be considered. If the %_PRB_Utilization_2 is greater than the PRB_Threshold2, the macro base station may need to be offloaded. Accordingly, an increase of the offset may be considered. This action is an example of action 205 in FIG. 2.

170 Macro base station requests the pico base station within its coverage area to report the amount of data in their downlink buffers/queues.

180 Pico base station respond to Macro base station by sending Datapicobuffers. The Datapicobuffers is an example of the first uplink buffer load value and/or the first downlink buffer load value.

190 Macro base station checks for each pico base station within its coverage area if a condition (Datapicobuffers>DatapicoThreshold) OR (number of active user equipments in uplink and/or downlink for pico>UserThreshold1) OR (%_PRB Utilization_1>PRB_Threshold1) is true then action 100 is performed again, otherwise action 200 is performed. The DatapicoThreshold is an example of the first uplink buffer load threshold value and/or the first downlink buffer load threshold value. UserThreshold1 is an example of the first uplink user equipment load threshold value, and/or the first downlink user equipment load threshold value. "number of active user equipments in uplink and/or downlink for pico" relates to the first uplink user equipment load value and/or the first downlink user equipment load value. "%_PRB_utilization_1" is an example of the first uplink physical resource block load value and/or the first downlink physical resource block load value. The PRB_Threshold1 is an example of the first uplink physical resource block load threshold value and/or the first downlink physical resource block load threshold value. If the Datapicobuffers is less than the DatapicoThreshold, the picobase station may be able to serve more user equipments. Accordingly, an increase of the offset may be considered. If the number of active user equipments in uplink and/or downlink for macro is greater than the UserThreshold2, the macro base station may need to be offloaded. Accordingly, an increase of the offset may be considered. If the %_PRB_Utilization_2 is greater than the PRB_Threshold2, the macro base station may need to be offloaded. Accordingly, an increase of the offset may be considered,

200 Macro base station decides to extend the range of pico base station, A value N, indicating a certain number of dBs, to be used in cell selection is determined by the macro base station. The value N is an example of the offset value. In this example, it has been decided to extend the range of the pico base station. Thus, the value N shall be increased. As an example, the value N is set to its current value increased by a step size. The step size may be any reasonably small number, such as between −10 dB and +10 dB. In many examples, the step size may be 1-3 dB. A small step size, such as 1-3 dB, yields minor adjustments as compared to a large step size, such as 10 dB. In other examples, it may be decided to decrease the range of the pico base station. Thus, the value N shall be decreased. Then, as an example, the value N is set to its current values decreased by the step size. This action is an example of action 205 in FIG. 2.

210 Macro base station applies a cell specific selection offset according to the value N when making handover decisions involving the pico base station.

220 Notifies the pico base station the determined cell specific selection offset N to use. When the value of N has been applied the preceding actions 100-200 may be performed again to evaluate the offset value currently in use. Hence, the offset is determined by iteratively performing the actions above. This action is an example of action 206 in FIG. 2.

Turning to FIG. 7, there is shown an exemplifying, schematic combined signaling and flow chart for describing a second exemplifying method for determining the offset, when performed in a pico base station (or the first radio network node 110). In this example, the pico base station has access to thresholds to be applied by both the macro and pico base stations. Information about the thresholds and/or values may be conveyed to the pico base station, which makes decisions or estimations. In this example, the determination of the offset is performed stepwise in that, for example, first the geographical distance and the inter-site-distances are taken into account for determining the offset, next the radio distances are taken into account and, finally, the load on macro/pico base stations are taken into account. In the description below, "&" is a logical AND-operator and OR is a logical OR-operator. Abbreviations D1/D2, distance D1/D2, DThreshold_1/2, RSRPneighbors, RSRPneighbors_Threshold, Databuffers, DataThreshold, Datapicobuffers, and DatapicoThreshold are explained above in conjunction with FIG. 6. In the Figure, a macro base station is denoted "Macro" and a pico base station is denoted "Pico".

The following actions may be performed. In some embodiments, the order of the actions may differ from what is indicated below.

100 OAM notifies macro base station of the inter-site distance (ISD) with the neighbor macro base stations, D2, and of the distance to pico base station, D1, within the coverage area of the macro base station.

110 Macro base station signals to pico base station within its coverage area the ISD of macro base stations, D2, and the distance of pico base station to the closest macro base stations, D1, in addition, macro base station sends the thresholds to be used in comparisons, DThreshold_1 & DThreshold_2. This action is an example of action 201, 202 and 205 in FIG. 2.

120 Pico base station checks if a condition (distance D1 to neighbor macro base stations is higher than DThreshold_1.) & (the ISD D2 of neighbor macro base stations is higher than DThreshold_2) is true. This action is an example of action 205 in FIG. 2.

130 Pico base station notifies the macro base station on the outcome of the comparison in 120, such as true or false of the condition in action 120.

140 Pico base station decides on the outcome of comparison in 120. If the condition is not true an action 150 is performed, otherwise action 100 is performed.

150 Pico base station asks for RSRPneighbors_Threshold to be used in RSRP comparison.

160 Macro base station signals to pico base station the RSRPneighbors_Threshold. This action is an example of action 205/217 in FIG. 2.

170 Pico base station measures RSRPs from neighbor macro base stations & checks if (max(RSRPneighbors)<RSRPneighbors_Threshold) is not true then an action 180 is performed, otherwise the pico base station notifies the macro base station and continues with action 100. This action is an example of action 205 in FIG. 2.

180 Pico base station asks macro base station to measure data sizes in its buffers/queues.

190 Macro base station measures the amount of data in the buffers/queues for downlink transmission, Databuffers.

200 Macro base station checks if a condition (Databuffers>DataThreshold) OR (number of active user equipments in uplink/downlink for macro>UserThreshold2) OR (%_PRB_Utilization_2>PRB_Threshold2) is true then action 210 is performed, otherwise pico base station is notified and action 100 is performed. This action may, in some embodiments, be performed by the pico base station when the macro base station transmits the Databuffers, the DataThreshold etc. to the pico base station.

210 Macro base station informs pico base station with the outcome of comparison in 200 and transmits a threshold for the comparison DatapicoThreshold.

220 Pico base stations checks the outcome of comparison at action 200. If the outcome is true then action 230 is performed, otherwise action 100 is performed.

230 Pico base station checks if a condition (Datapicobuffers>DatapicoThreshold) OR (number of active user equipments in uplink/downlink for pico>UserThreshold1) OR (%_PRB_Utilization_1>PRB_Threshold1) is not true then action 240 is performed, otherwise action 100 is performed.

240 Pico base station decides to extend its range. A value N, indicating a certain number of dBs, to be used in cell selection is determined by the pico base station.

250 Pico base station applies a cell specific selection offset according to the value N when deciding on handovers to macro base station 260 Pico base station notifies the macro base station which defined cell specific selection offset N it is using.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for determining a cell selection offset for selection of a cell of a low power radio base station, comprising:
   determining, by a macro radio base station, the cell selection offset based at least on (a) a first distance value comprising a first geographical distance value indicating a geographical distance between the low power radio base station and the macro radio base station and (b) a load value indicative of a load on the macro radio base station, and further based on a load value indicative of a load on the low power radio base station; and
   sending, by the macro radio base station, information about the cell selection offset to the low power radio base station,
   wherein the cell selection offset is to be used, by user equipment, in combination with at least one power measurement to perform a handover evaluation in relation to at least the low power radio base station and the macro radio base station.

2. The method according to claim 1, wherein the cell selection offset is increased when the first geographical distance value is less than a first threshold value for the first geographical distance value.

3. The method according to claim 1, wherein the first distance value further comprises a first radio distance value.

4. The method according claim 1, wherein the cell selection offset is further based on a second distance value for indicating distance between the macro radio base station and another macro radio base station.

5. The method according to claim 4, wherein the cell selection offset is increased when the second distance value is less than a second threshold value for the second distance value.

6. The method according to claim 4, wherein the second distance value comprises at least one of a second radio distance value and a second geographical distance value.

7. The method according to claim 1, wherein the method further comprises:
   when the cell selection offset is greater than an offset threshold for the cell selection offset, at least partly muting transmission from the macro radio base station, wherein the muting reduces downlink interference towards a user equipment served by the low power radio base station.

8. The method according to claim 1, wherein the information about the cell selection offset comprises a command for instructing the low power radio base station to set the cell selection offset to the offset value.

9. The method according to claim 1, wherein the low power radio base station is a pico radio base station or a micro radio base station.

10. The method according to claim 1, wherein the cell of the low power radio base station is at least partly comprised in a second cell of the macro radio base station.

11. A macro radio base station for determining a cell selection offset for selection of a cell of a low power radio base station, comprising:
a processing circuit configured to determine the cell selection offset based at least on (a) a first distance value comprising a first geographical distance value for indicating a geographical distance between the low power radio base station and the macro radio base station, and (b) a load value indicative of a load on the macro radio base station, and further based on a load value indicative of a load on the low power radio base station; and
a transmitter configured to send information about the cell selection offset to the low power radio base station,
wherein the cell selection offset is to be used, by user equipment, in combination with at least one power measurement to perform a handover evaluation in relation to at least the low power radio base station and the macro radio base station.

12. The macro radio base station of claim 11, wherein the load value indicative of a load on the low power radio base station comprises a first uplink buffer load value indicative of a first buffer load on uplink buffers relating to the low power radio base station, and/or a first downlink buffer load value indicative of a first buffer load on downlink buffers relating to the low power radio base station.

13. The macro radio base station of claim 11, wherein the load value indicative of a load on the low power radio base station comprises a first uplink user equipment load value indicative of number of user equipments served by the low power radio base station for uplink transmission, and/or a first downlink user equipment load value indicative of number of user equipments served by the low power radio base station for downlink transmission.

14. The macro radio base station of claim 11, wherein the load value indicative of a load on the low power radio base station comprises a first uplink physical resource block, PRB, load value indicative of uplink PRB utilization, and/or a first downlink physical resource block, PRB, load value indicative of downlink PRB utilization.

15. The method of claim 1, wherein the load value indicative of a load on the low power radio base station comprises a first uplink buffer load value indicative of a first buffer load on uplink buffers relating to the low power radio base station, and/or a first downlink buffer load value indicative of a first buffer load on downlink buffers relating to the low power radio base station.

16. The method of claim 1, wherein the load value indicative of a load on the low power radio base station comprises a first uplink user equipment load value indicative of number of user equipments served by the low power radio base station for uplink transmission, and/or a first downlink user equipment load value indicative of number of user equipments served by the low power radio base station for downlink transmission.

17. The method of claim 1, wherein the load value indicative of a load on the low power radio base station comprises a first uplink physical resource block, PRB, load value indicative of uplink PRB utilization, and/or a first downlink physical resource block, PRB, load value indicative of downlink PRB utilization.

18. The method of claim 1, wherein the load value indicative of a load on the macro radio base station comprises a second uplink buffer load value indicative of a second buffer load on uplink buffers relating to the macro radio base station, and/or a second downlink buffer load value indicative of a second buffer load on downlink buffers relating to the macro radio base station.

19. The method of claim 1, wherein the load value indicative of a load on the macro radio base station comprises a second uplink user equipment load value indicative of number of user equipments served by the macro radio base station for uplink transmission, and/or a second downlink user equipment load value indicative of number of user equipments served by the macro radio base station for downlink transmission.

20. The method of claim 1, wherein the load value indicative of a load on the macro radio base station comprises a second uplink physical resource block, PRB, load value indicative of uplink PRB utilization, and/or a second downlink physical resource block, PRB, load value indicative of downlink PRB utilization.

* * * * *